United States Patent
He et al.

(10) Patent No.: US 9,831,698 B2
(45) Date of Patent: Nov. 28, 2017

(54) MOBILE POWER SUPPLY TERMINAL AND POWER SUPPLY METHOD THEREOF

(71) Applicant: Huawei Device Co., Ltd., Shenzhen (CN)

(72) Inventors: Yanguo He, Xi'an (CN); Lixiang Zheng, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 168 days.

(21) Appl. No.: 14/941,863

(22) Filed: Nov. 16, 2015

(65) Prior Publication Data

US 2016/0072330 A1    Mar. 10, 2016

Related U.S. Application Data

(63) Continuation of application No. PCT/CN2014/084604, filed on Aug. 18, 2014.

(30) Foreign Application Priority Data

Aug. 27, 2013   (CN) .......................... 2013 1 0379511

(51) Int. Cl.
    *H02J 7/00*    (2006.01)
(52) U.S. Cl.
    CPC ............ *H02J 7/0054* (2013.01); *H02J 7/007* (2013.01); *H02J 7/0052* (2013.01); *H02J 2007/0062* (2013.01)
(58) Field of Classification Search
    CPC ........ H02J 7/0054; H02J 7/0052; H02J 7/007; H02J 2007/0062

USPC .................................................. 320/103, 128
    See application file for complete search history.

(56) References Cited

U.S. PATENT DOCUMENTS

| 6,209,105 B1 | 3/2001 | Hamamoto |
| 6,320,428 B1 * | 11/2001 | Atsumi ................. G11C 5/143 327/143 |
| 6,895,515 B1 | 5/2005 | Yamazaki |
| 7,793,118 B2 * | 9/2010 | Ho ......................... G06F 1/266 320/137 |

(Continued)

FOREIGN PATENT DOCUMENTS

| CN | 1627590 A | 6/2005 |
| CN | 101201681 A | 6/2008 |

(Continued)

OTHER PUBLICATIONS

Partial English Translation and Abstract of Chinese Patent Application No. CN101465554, Nov. 11, 2015, 3 pages.

(Continued)

*Primary Examiner* — M'baye Diao
(74) *Attorney, Agent, or Firm* — ConleyRose, P.C.

(57) ABSTRACT

A mobile power supply terminal and a power supply method is presented. For the mobile power supply terminal, a trigger circuit and a control circuit are added to a conventional device. After a to-be-charged device is connected to the mobile terminal, one end of a power supply interface generates a level signal, to make the trigger circuit generate a trigger signal; and then the control circuit controls, according to the trigger signal, the mobile power supply terminal to enter a power supply mode, and controls a power supply source to charge the to-be-charged device using the power supply interface.

10 Claims, 2 Drawing Sheets

(56) References Cited

U.S. PATENT DOCUMENTS

| | | | | |
|---|---|---|---|---|
| 8,405,254 | B2* | 3/2013 | Kitano | H02J 9/005 307/116 |
| 9,655,175 | B2* | 5/2017 | Ekbote | H05B 33/0815 |
| 2004/0063464 | A1 | 4/2004 | Akram et al. | |
| 2004/0164707 | A1 | 8/2004 | Veselic et al. | |
| 2006/0267553 | A1 | 11/2006 | Chuang et al. | |
| 2013/0166928 | A1 | 6/2013 | Yang | |
| 2013/0181660 | A1 | 7/2013 | Zhou | |

FOREIGN PATENT DOCUMENTS

| | | |
|---|---|---|
| CN | 101465554 A | 6/2009 |
| CN | 201285535 Y | 8/2009 |
| CN | 201349458 Y | 11/2009 |
| CN | 101677143 A | 3/2010 |
| CN | 101788842 A | 7/2010 |
| CN | 101853970 A | 10/2010 |
| CN | 201918798 U | 8/2011 |
| CN | 202041903 U | 11/2011 |
| CN | 202196413 U | 4/2012 |
| EP | 1482619 A2 | 12/2004 |
| EP | 3001532 A1 | 3/2016 |
| JP | H1091303 A | 4/1998 |
| JP | 2000152513 A | 5/2000 |
| JP | 2001092565 A | 4/2001 |
| JP | 2009247161 A | 10/2009 |
| JP | 2010142098 A | 6/2010 |
| JP | 2011234574 A | 11/2011 |
| JP | 2012222936 A | 11/2012 |
| WO | 2004075371 A1 | 9/2004 |
| WO | 2010099483 A2 | 9/2010 |
| WO | 2010129369 A2 | 11/2010 |

OTHER PUBLICATIONS

Partial English Translation and Abstract of Chinese Patent Application No. CN101788842, Nov. 11, 2015, 3 pages.
Partial English Translation and Abstract of Chinese Patent Application No. CN201285535, Nov. 11, 2015, 3 pages.
Foreign Communication From a Counterpart Application, PCT Application No. PCT/CN2014/084604, English Translation of International Search Report dated Oct. 27, 2014, 3 pages.
Foreign Communication From a Counterpart Application, PCT Application No. PCT/CN2014/084604, English Translation of Written Opinion dated Oct. 27, 2014, 11 pages.
Foreign Communication From a Counterpart Application, European Application No. 14838976.0, Extended European Search Report dated Apr. 28, 2016, 7 pages.
Partial English Translation and Abstract of Japanese Patent Application No. JP2009247161, Oct. 22, 2009, 16 pages.
Partial English Translation and Abstract of Japanese Patent Application No. JP2010142098, Jun. 24, 2010, 6 pages.
Partial English Translation and Abstract of Japanese Patent Application No. JP2011234574, Nov. 17, 2011, 13 pages.
Foreign Communication From a Counterpart Application, Japanese Application No. 2016-518830, Japanese Office Action dated Jan. 4, 2017, 6 pages.
Foreign Communication From a Counterpart Application, Japanese Application No. 2016-518830, English Translation of Japanese Office Action dated Jan. 4, 2017, 6 pages.
Partial English Translation and Abstract of Chinese Patent Application No. CN1627590, Jun. 15, 2005, 18 pages.
Partial English Translation and Abstract of Chinese Patent Application No. CN101853970, Oct. 6, 2010, 13 pages.
Partial English Translation and Abstract of Chinese Patent Application No. CN201319458, Sep. 30, 2009, 18 pages.
Foreign Communication From a Counterpart Application, Chinese Application No. 201310379511.4, Chinese Office Action dated Jul. 22, 2016, 7 pages.
Machine Translation and Abstract of Chinese Publication No. CN101201681, Jun. 18, 2008, 5 pages.
Machine Translation and Abstract of Chinese Publication No. CN101677143, Mar. 24, 2010, 11 pages.
Foreign Communication From a Counterpart Application, Chinese Application No. 201310379511.4, Chinese Notice of Allowance dated May 16, 2017, 4 pages.
Machine Translation and Abstract of Japanese Publication No. JP2000152513, May 30, 2000, 19 pages.
Machine Translation and Abstract of Japanese Publication No. JP2012222936, Nov. 12, 2012, 17 pages.
Foreign Communication From a Counterpart Application, Japanese Application No. 2016-518830, Japanese Notice of Rejection dated Sep. 5, 2017, 3 pages.
Foreign Communication From a Counterpart Application, Japanese Application No. 2016-518830, English Translation of Japanese Notice of Rejection dated Sep. 5, 2017, 4 pages.

* cited by examiner

MOBILE POWER SUPPLY TERMINAL AND POWER SUPPLY METHOD THEREOF

CROSS-REFERENCE TO RELATED APPLICATIONS

This application is a continuation of International Application No. PCT/CN2014/084604, filed on Aug. 18, 2014, which claims priority to Chinese Patent Application No. 201310379511.4, filed on Aug. 27, 2013, both of which are incorporated herein by reference in their entireties.

TECHNICAL FIELD

The present disclosure relates to the field of power supply from a mobile power supply terminal, and in particular, to a mobile power supply terminal and a power supply method thereof.

BACKGROUND

Currently, with development of communications technologies, a battery level of a mobile terminal such as a mobile phone, a mobile broadband router, or a tablet computer becomes higher, where battery capacities of the mobile phone and the mobile broadband router exceed 3000 milliampere-hours (mAh), and a battery capacity of the tablet computer exceeds 6000 mAh, which makes it possible for the mobile terminal to be used as a mobile power supply source to supply power to another device. After an existing mobile terminal device is shut down, if a to-be-charged device needs to be charged, either of the following two methods may be selected to make a mobile power supply terminal supply power to the to-be-charged device.

A first method is a user manually turns on the mobile device, and after being turned on, the device is configured to trigger, using a man-machine interface of the terminal, the terminal to supply power outwards.

A second method is the user manually turns on the mobile device, and after the mobile device is turned on, a ground point of a charging interface of the to-be-charged device pulls down an electrical level of a power supply trigger end of the mobile device, thereby triggering the mobile device to supply power outwards.

The following problems exist when the foregoing two methods are used to charge the to-be-charged device in a shutdown mode of the terminal.

1: The mobile power supply terminal must first be completely turned on according to a normal turn-on mode. The startup time is long, and the mobile power supply terminal cannot be charged quickly.

2: The mobile power supply terminal is completely turned on according to the normal turn-on mode, and many power-consuming functional modules of the mobile power supply terminal are turned on. For example, when the mobile terminal is a tablet computer, after the tablet computer is completely started, at least functions such as a backlight, a display screen, a network interface card, and a firewall are enabled; for another example, when the mobile terminal is a mobile phone, after the mobile phone is turned on, a communications functional module is automatically turned on. Since these hardware or software modules are all energy-consuming modules, the terminal has large power consumption when the terminal charges an external device, and therefore, the energy consumption is large.

3: The mobile terminal is in a complete turn-on state after being normally turned on, charges an external device and also consumes electricity itself, which causes a large current in a power supply source, and high temperature of the battery. If this lasts for a long time, problems such as a short life of the battery and poor stability may be caused.

In addition, in a startup state, the mobile terminal supplies power outwards, and also turns on another functional module, for example, a functional unit for implementing a function other than power supply, such as a communications unit or a video display functional unit, which causes a large current in the power supply source, and unstable power supply. It should be ensured that power supply meets requirements and a communications data service in another communications function is not limited.

SUMMARY

Embodiments of the present disclosure provide a mobile power supply terminal and a power supply method thereof, which are designed for solving problems such as an unstable current, and a short service life of a power supply source due to a long time for an existing mobile power supply terminal to switch from a shutdown mode to a power supply mode, and large electricity consumption of another functional unit of the mobile power supply terminal during outward power supply.

To solve the foregoing technical problems, the embodiments of the present disclosure disclose various following technical solutions. According to a first aspect, a mobile power supply terminal is provided, where the mobile power supply terminal includes a power supply source, a control circuit, a power supply interface, and a trigger circuit, where the power supply source is separately connected to the power supply interface and the control circuit; one end of the power supply interface is separately connected to the trigger circuit and the control circuit, and the other end is configured to be connected to a charging interface of a to-be-charged device; the to-be-charged device is connected to the mobile power supply terminal using the power supply interface, so that one end of the power supply interface generates a level signal; and the trigger circuit generates a trigger signal according to the level signal, and sends the trigger signal to the control circuit; and the control circuit controls, according to the trigger signal, the mobile power supply terminal to enter a power supply mode, and controls the power supply source to supply power to the to-be-charged device using the power supply interface, where the control circuit in the power supply mode is configured only to control the power supply source to supply power to the to-be-charged device.

In a first implementation solution of the first aspect, the control circuit includes a controller, a shutdown-without-poweroff power source, and a controlled switch, where a turn-on signal input end of the controller is connected to the shutdown-without-poweroff power source; an input end of the controlled switch is connected to the shutdown-without-poweroff power source, a control end is connected to an output end of the trigger circuit, and an output end is grounded; after the control end of the controlled switch receives the trigger signal, the input end and the output end of the controlled switch are conducted to each other, so that an electrical level of the turn-on signal input end of the controller is pulled down; and the controller is configured to, after the electrical level of the turn-on signal input end is pulled down, control the mobile power supply terminal to enter the power supply mode, and control the power supply source to supply power to the to-be-charged device using the power supply interface.

In a second implementation solution of the first aspect, a transformer is disposed between the power supply source and the power supply interface; and an enabling end of the transformer is connected to the controller, and is configured to receive a power supply control signal and turn on the transformer according to the power supply control signal, to form a path between the power supply source and the power supply interface, where the power supply control signal is generated by the controller according to the trigger signal and output to the transformer.

In a third implementation solution of the first aspect, the control circuit is further configured to receive the trigger signal, and control, according to a user selection or a specified command, the mobile power supply terminal to turn off a communications module and/or a display.

In a fourth implementation solution of the first aspect, the control circuit is further configured to, after the charging interface is disconnected from the to-be-charged device, control, according to a control instruction selected by the user or a specified instruction, the mobile power supply terminal to enter a shutdown mode.

According to a second aspect, a power supply method of a mobile power supply terminal is provided, where the power supply method of the mobile power supply terminal includes connecting a to-be-charged device to the mobile power supply terminal using a power supply interface of the mobile power supply terminal, so that one end of the power supply interface generates a level signal; generating, by a trigger circuit of the mobile power supply terminal, a trigger signal according to the level signal, and sending the trigger signal to a control circuit of the mobile power supply terminal; and controlling, by the control circuit according to the trigger signal, the mobile power supply terminal to enter a power supply mode, and controlling the power supply source to supply power to the to-be-charged device using the power supply interface, where, the control circuit in the power supply mode is configured only to control the power supply source to supply power to the to-be-charged device.

In a first implementation solution of the second aspect, the controlling, by the control circuit according to the trigger signal, the mobile power supply terminal to enter a power supply mode, and controlling the power supply source to supply power to the to-be-charged device using the power supply interface includes inputting the trigger signal to a control end of a controlled switch of the control circuit, so that an input end and an output end of the controlled switch are conducted to each other, where the input end of the controlled switch is connected to a shutdown-without-poweroff power source, and the output end is grounded; pulling down an electrical level of a turn-on signal input end of a controller of the control circuit connected to the shutdown-without-poweroff power source; and after the electrical level of the turn-on signal input end is pulled down, controlling, by the controller, the mobile power supply terminal to enter the power supply mode, and controlling the power supply source to supply power to the to-be-charged device using the power supply interface.

In a second implementation solution of the second aspect, the controlling the power supply source to supply power to the to-be-charged device using the power supply interface includes, after the electrical level of the turn-on signal input end is pulled down, generating, by the controller, a power supply control signal; receiving, by an enabling end of a transformer connected between the power supply source and the power supply interface, the control signal, and turning on the transformer according to the control signal, to form a path between the power supply source and the power supply interface; and supplying, by the power supply source, power to the to-be-charged device using the transformer and the power supply interface.

In a third implementation solution of the second aspect, the method further includes receiving, by the control circuit, the trigger signal, and controlling, according to a user selection or a specified command, the mobile power supply terminal to turn off a communications module and/or a display.

In a fourth implementation solution of the second aspect, the method further includes disconnecting the to-be-charged device from the mobile power supply terminal; and controlling, by the control circuit according to a control instruction selected by the user or a specified instruction, the mobile power supply terminal to enter a shutdown mode.

In the embodiments of the present disclosure, a trigger circuit is added to a mobile power supply terminal, so that when a first pin of a power supply interface is connected to a to-be-charged device or a ground point of a charging connection line, the trigger circuit generates a trigger signal, to turn on a controller; and then the controller generates a control signal, to conduct a power supply source and the power supply interface to supply power outwards, having the foregoing advantages. When the mobile power supply terminal in the embodiments of the present disclosure is used to supply power, in a shutdown state of the mobile power supply terminal, after the to-be-charged device is connected to the power supply interface of the mobile power supply terminal, the mobile power supply terminal is directly triggered to enter a power supply mode, and only hardware and an application program that are related to power supply, such as a power supply control unit, are turned on. In this way, a user does not need to manually turn on the mobile power supply terminal according to a normal procedure, thereby facilitating an operation and shortening a readiness time for charging the to-be-charged device.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

The following further describes specific embodiments of the present disclosure in detail with reference to the accompanying drawings and the embodiments. The following embodiments are used to describe the present disclosure, but are not used to limit the scope of the present disclosure.

Embodiment 1

Figure 1:
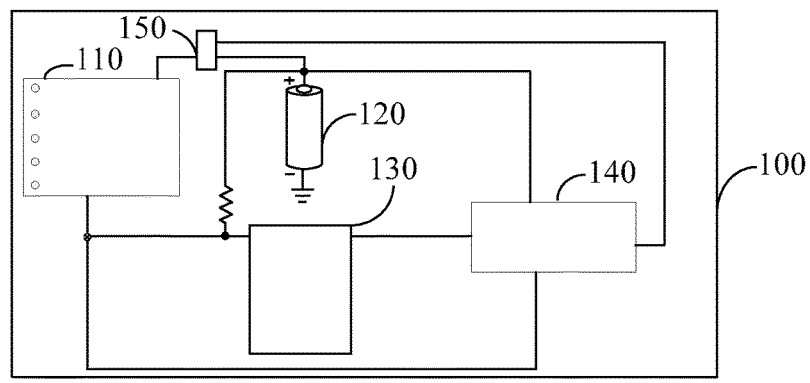
FIG. 1 is a schematic structural diagram of a mobile power supply terminal according to an embodiment of the present disclosure.

As shown in FIG. 1, this embodiment provides a mobile power supply terminal 100, including a power supply source 120, a control circuit 140, a power supply interface 110, and a trigger circuit 130, where the power supply source 120 is separately connected to the power supply interface 110 and the control circuit 140; one end of the power supply interface 110 is separately connected to the trigger circuit 130 and the control circuit 140, and the other end is configured to be connected to a charging interface of a to-be-charged device; the to-be-charged device is connected to the mobile power supply terminal 100 using the power supply interface 110, so that one end of the power supply interface 110 generates a level signal; and the trigger circuit 130 generates a trigger signal according to the level signal, and sends the trigger signal to the control circuit 140; and the control circuit 140 controls, according to the trigger signal, the mobile power supply terminal to enter a power supply mode, and controls the power supply source 120 to supply power to the to-be-charged device using the power supply interface 110, where the control circuit 140 in the power supply mode is configured only to control the power supply source to supply power to the to-be-charged device.

A controlled component 150 is controlled by the control circuit, where the controlled component is configured to implement connection or disconnection between the power supply interface 110 and the power supply source 120, thereby implementing whether the power supply source 120 supplies power outwards or not.

The mobile power supply terminal 100 may be a common mobile device, for example, a mobile terminal provided with a power supply source such as a smartphone, a tablet computer, a notebook computer, an electronic-book, a palm-top computer, or a mobile router. The power supply source is generally an electric plate in the foregoing terminal.

The power supply interface 110 may be any common power supply interface, such as a 4-pin or 3-pin power supply interface, and a Universal Serial Bus (USB) interface is preferred in this embodiment. The USB interface has both a data transmission function and a power source transmission function, so that one interface is reduced and the structure is reduced; in addition, due to commonality of the USB interface, most mobile power supply terminals are provided with the USB interface, so that few changes are made to the mobile power supply terminal.

After the to-be-charged device is connected to the mobile power supply terminal using the power supply interface, a level signal generated at one end, connected to the trigger circuit, of the power supply interface may be a high electrical level or a low electrical level. When the level signal is a high electrical level, in the to-be-charged device or a charging interface of the to-be-charged device, there is a power source for forming the high electrical level. The level signal is preferably a low electrical level. The low electrical level can be formed by only connecting one of pins of the power supply interface to a ground point of the charging interface of the to-be-charged device. During specific implementation, a turn-on trigger end of the trigger circuit is connected to the power supply source, and the turn-on trigger end is connected to a pin connected to the ground point of the to-be-charged device. Therefore, after the mobile power supply terminal is connected to the to-be-charged device, a voltage of the turn-on trigger end of the trigger circuit is pulled down, thereby triggering the trigger circuit to work and generate a trigger signal.

The trigger circuit may be a circuit structure that is formed by only logic circuits, or may be a trigger that has been encapsulated, where corresponding software may further run in the trigger. The trigger circuit may be a single-pulse trigger, which, after receiving the level signal, outputs a pulse that lasts is, 3 s, or 5 s, where the pulse may be considered as the trigger signal in this embodiment.

The mobile power supply terminal includes at least the following various modes. A first mode can be a startup mode, in which the mobile power supply terminal may assign, according to different functions to be implemented, hardware and software implementing different functions to different functional units. In the startup mode, multiple functions are enabled in the mobile power supply terminal. If the mobile power supply terminal is a smartphone, a communications functional unit, a video display unit, and an outward power supply unit may be turned on. In this case, electricity consumption of the mobile power supply terminal itself is large, and a current provided by the power supply source to the mobile power supply terminal is also large.

A second mode can be a shutdown mode, in which all functional units of the mobile terminal are turned off, and do not complete any function. In an existing mobile power supply terminal, outward charging cannot be performed in the shutdown mode. If the outward charging needs to be performed in the shutdown mode, the mobile power supply terminal first needs to enter the startup mode, where entering the startup mode is triggered using a physical control such as a button provided on the mobile terminal. After startup, multiple functional units are turned on. Therefore, the charging can be performed only after the shutdown mode is switched to the startup mode, resulting in a problem that a charging readiness time is long.

A third mode can be a power supply mode, in which the mobile power supply terminal turns on only a power supply functional unit that is related to power supply. In the power supply mode, the control circuit 140 turns on only a charging control unit, and then the charging control unit controls the power supply source to supply power outwards. The power supply source, the power supply interface, and the trigger circuit and the control circuit that must be involved in a power supply process form the power supply functional unit.

In view of the foregoing three modes of the mobile power supply terminal, in the power supply mode, compared with the startup mode, fewer functional units are turned on, so that electricity consumption is smaller, and a time used for the turn-on is also shorter; compared with the shutdown mode, outward charging can be performed. In the mobile power supply terminal provided in this embodiment, the trigger circuit and the control circuit are introduced, so that a third power supply mode in addition to the startup mode and the shutdown mode is implemented. When a user only needs to supply power outwards, the power supply mode is adopted, and energy consumption can be reduced. In addition, if the mobile power supply terminal is currently in the shutdown mode, and the to-be-charged device needs to be charged, the shutdown mode can be directly switched to the power supply mode by connecting the power supply interface to the charging interface of the to-be-charged device. Because few functional units are turned on in the mobile power supply terminal, quick charging can be implemented. Moreover, because the power supply source only needs to supply power outwards, and does not need to provide a current to a functional unit inside the mobile power supply terminal, a current inside the power supply source is small, thereby effectively avoiding problems caused by excessive heat consumption, such as a short life of the power supply source and an unstable current.

Embodiment 2

Figure 2:
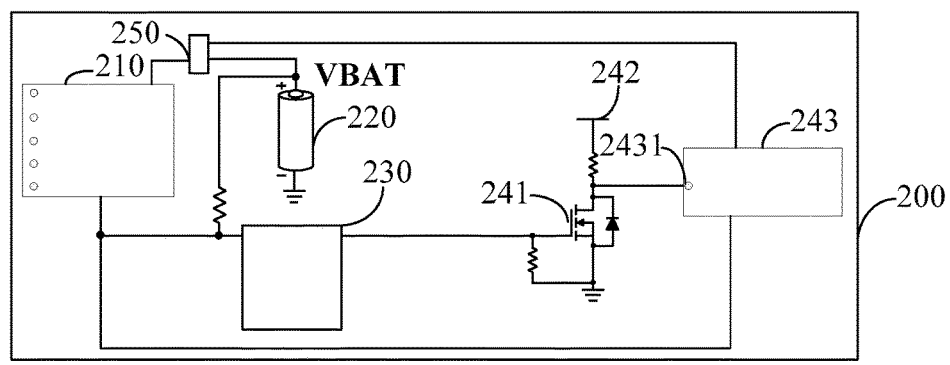
FIG. 2 is a schematic structural diagram of a mobile power supply terminal according to an embodiment of the present disclosure.

As shown in FIG. 2, a mobile power supply terminal 200 in this embodiment includes a power supply source 220, a control circuit, a power supply interface 210, and a trigger circuit 230, where the power supply source 220 is separately connected to the power supply interface 210 and the control circuit; one end of the power supply interface 210 is separately connected to the trigger circuit and the control circuit, and the other end is configured to be connected to a charging interface of a to-be-charged device; the to-be-charged device is connected to the mobile power supply terminal 200 using the power supply interface 210, so that one end of the power supply interface 210 generates a level signal; and the trigger circuit 230 generates a trigger signal according to the level signal, and sends the trigger signal to the control circuit; and the control circuit controls, according to the trigger signal, the mobile power supply terminal to enter a power supply mode, and controls the power supply source to supply power to the to-be-charged device using the power supply interface, where the control circuit in the power supply mode is configured only to control the power supply source to supply power to the to-be-charged device.

The control circuit includes a controller 243, a shutdown-without-poweroff power source 242, and a controlled switch 241, where a turn-on signal input end 2431 of the controller 243 is connected to the shutdown-without-poweroff power source 242; an input end of the controlled switch 241 is connected to the shutdown-without-poweroff power source 242, a control end is connected to an output end of the trigger circuit 230, and an output end is grounded; after the control end of the controlled switch 241 receives the trigger signal, the input end and the output end of the controlled switch 241 are conducted to each other, so that an electrical level of the turn-on signal input end 2431 of the controller 243 is pulled down; and the controller 243 is configured to, after the electrical level of the turn-on signal input end is pulled down, control the mobile power supply terminal to enter the power supply mode, and control the power supply source to supply power to the to-be-charged device using the power supply interface.

The shutdown-without-poweroff power source is a micro power source that remains in a power supply state when the mobile power supply terminal is shut down, and generally has a small rated voltage or current, for example, a micro power source that provides a voltage of 1.6 volts (V) to a circuit in the control circuit.

The controlled switch may be a controlled switch circuit formed by several electronic components or an integrated and encapsulated controlled chip, or may be a transistor shown in FIG. 2, or may be a common triode. In this embodiment, the controller 243 is triggered using a low electrical level. In a specific implementation process, a control circuit or a device that is triggered by a high electrical level and has high voltage withstanding performance may also be used as the controller.

The controller may be a programmable logic controller (PLC), a digital signal processor (DSP), or an micro-control unit (MCU), or may be a pure circuit structure. If the controller is a PLC, a DSP, or an MCU, the controller includes hardware consisting of various electronic components, such as a processor, where a program runs in the processor, and a storage medium. The program is stored in the storage medium; and the storage medium includes memories such as a read-only memory (ROM), a random access memory (RAM), and a flash memory. When running in the processor, the program can complete at least the following function, after the electrical level of the turn-on signal input end of the controller 243 is pulled down, controlling the mobile power supply terminal to enter the power supply mode, and controlling the power supply source to supply power to the to-be-charged device using the power supply interface.

Based on Embodiment 1, this embodiment further provides a preferred structure of the control circuit, where the structure of the control circuit features quick reaction, simple structure, and easy production.

As an further improvement of this embodiment, a transformer is disposed between the power supply source and the power supply interface; and an enabling end of the transformer is connected to the controller, and is configured to receive a power supply control signal and turn on the transformer according to the power supply control signal, to form a path between the power supply source and the power supply interface, where the power supply control signal is generated by the controller according to the trigger signal and output to the transformer.

In FIG. 2, the controlled component 250 is considered as the transformer in this embodiment. The enabling end of the transformer is connected to the controller 243; when the controller 243 outputs the power supply control signal, an electrical level of the enabling end of the transformer accords with an electrical level for turning on the transformer, and the transformer is turned on, further forming a power supply loop among the power supply source 220, the transformer, the power supply interface 210, and the to-be-charged device. In a specific implementation process, the controlled component 250 may also be the controlled switch. The structure of the controlled switch may be a structure such as a transistor, a triode, or a controlled chip. However, in this embodiment, the controlled component 250 is preferably the transformer because the transformer can be configured to change a voltage value of an output voltage. Generally, a voltage value of a voltage that can be output by a power supply source inside the mobile power supply terminal is small, and it is difficult to implement quick charging while meeting voltage values of voltages needed by different devices. Therefore, the transformer needs to be disposed to change the output voltage. In this embodiment, by taking advantage of that the transformer, which is located in a loop of the output voltage, is configured to change the voltage value of the output voltage, and may further be configured to implement whether or not the power supply source supplies power outwards, one structure implements two functions, so that the structure is exquisite, fewer components are used, hardware costs are low, and hardware size is small, which are beneficial to implement microminiaturization and integration of the mobile power supply terminal.

Embodiment 3

This embodiment is a further improvement of either technical solution in Embodiment 1 and Embodiment 2, and the difference from the foregoing technical solutions lies in that the control circuit is further configured to, when receiving the trigger signal, turn on a charging control unit, and turn off a communications control unit according to a selection of a user.

The control circuit may be divided into multiple control units, and a corresponding control unit is configured to control a state of a corresponding functional unit in a mobile power supply terminal. The control circuit includes at least a charging control unit configured to control whether to turn on a power supply unit in the mobile power supply terminal; and the communications control unit is configured to control a communications functional unit in the mobile power supply terminal. For example, when the mobile charging terminal is a smartphone, a communications unit for implementing communication is included; and a module for implementing the communications unit includes functional units such as a signal receiver (for example, an antenna), a modem, a decoder, an encoder, and a speaker. In this embodiment, after receiving the trigger signal, the control circuit first turns on the charging control unit, so as to control whether to perform charging, turns off the communications control unit according to a selection of the user, and further turns off the communications unit, so that when supplying power to the to-be-charged device, a power supply source does not need to simultaneously load the functional units of the communications unit. Therefore, a current of the power supply source is small, heat consumption is small, a service life of the power supply source can be prolonged, and the power supply source can maintain good power supply stability within a long time.

The selection of the user may be considered to be that, when the control circuit needs to control the power supply source to supply power outwards, it is detected that the mobile charging terminal also turns on a functional unit other than a charging function, for example including the communications control unit, or the like; and the mobile terminal is controlled to pop up a selection dialog box to prompt the user to select, and the user may select, according to a current need, whether to turn off the communications control unit, and the like, except for a functional unit related to a power supply function. When the mobile power supply terminal is a tablet computer, the tablet computer similarly includes the communications unit that exchanges data with a peripheral, and similarly may supply power outwards using the mobile power supply terminal in this embodiment, to achieve an objective of reducing power consumption and prolonging the service life of the power supply source.

For the mobile power supply terminal in this embodiment, a case in which a mobile terminal in a startup mode needs to supply power to a to-be-charged device is further considered. A user can make, according to a selection, the mobile terminal enter a power supply mode, or choose, according to a current need, to perform charging in the startup mode. Therefore, the mobile power supply terminal is more properly designed, and better meets a requirement of the user.

Embodiment 4

This embodiment is a further improvement on the basis of the embodiments in Embodiment 1 to Embodiment 3, and the difference from the technical solutions in Embodiment 1 to Embodiment 3 lies in that the control circuit is further configured to, after the charging interface is disconnected from the to-be-charged device, control, according to a control instruction selected by the user or a specified instruction, the mobile power supply terminal to enter a shutdown mode.

When the charging interface is disconnected from the to-be-charged device, it generally indicates that the to-be-charged device does not need to be charged any more or is fully charged, and the mobile power supply terminal needs to switch from a charging mode to the startup mode or the shutdown mode according to a selection performed by the user or according to a built-in specified instruction. The specified instruction may be that, within specified duration after the charging interface is disconnected from the to-be-charged device, a control instruction selected by the user is not received, and then for a purpose of energy conservation, the mobile power supply terminal is controlled to enter the shutdown mode. The specified duration may be duration such as 5 seconds, 10 seconds, or 15 seconds. The specified instruction may further be determined by the mobile power supply terminal according to a mode of the mobile power supply terminal before entering the charging mode. If the mobile power supply terminal is in the shutdown mode before entering the charging mode, the mobile power supply terminal enters the shutdown mode again; if the mobile power supply terminal is in the startup mode before entering the charging mode, the mobile power supply terminal enters the startup mode again, where the specified instruction includes a sub-instruction for state switch recording and a state control instruction for performing control according to state switch recorded by the sub-instruction for state switch recording. Therefore, the specified instruction may be a single control instruction or a control instruction set.

By means of the mobile power supply terminal in this embodiment, a control circuit controls a state of the mobile power supply terminal after the mobile power supply terminal disconnects a to-be-charged device from a power supply interface, which achieves an objective of reducing unnecessary power consumption, thereby prolonging standby duration of a power supply source.

Embodiment 5

Figure 3:
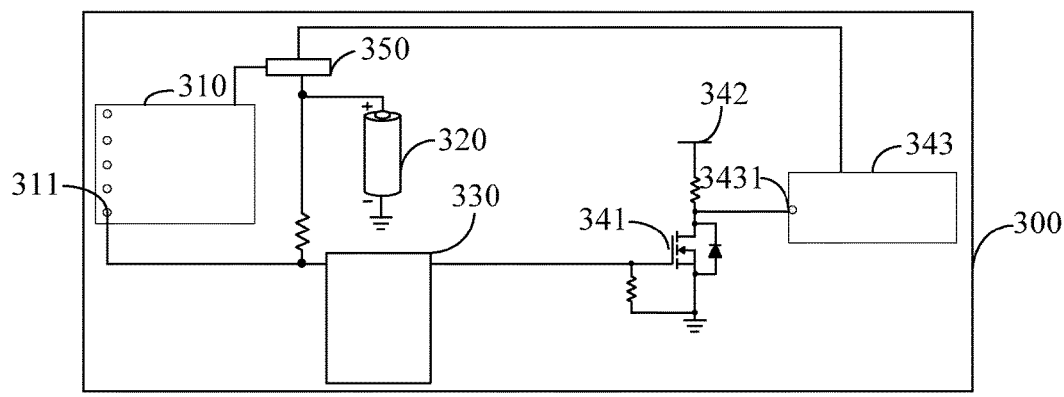
FIG. 3 is a schematic structural diagram of a mobile power supply terminal according to an embodiment of the present disclosure.

As shown in FIG. 3, the mobile power supply terminal 300 in this embodiment includes a power supply source 320, a control circuit, a power supply interface 310, and a trigger circuit 330, where the power supply source 320 is separately connected to the power supply interface 310 and the control circuit; one end of the power supply interface 310 is separately connected to the trigger circuit 330 and the control circuit, and the other end is configured to be connected to a charging interface of a to-be-charged device, where the power supply interface 310 includes a first pin 311; the to-be-charged device is connected to the mobile power supply terminal 300 using the power supply interface 310, so that one end of the power supply interface 310 generates a level signal; the trigger circuit 330 generates a trigger signal according to the level signal, and sends the trigger signal to the control circuit; and the first pin 311 is configured to be connected to a ground point in the charging interface of the to-be-charged device, so that after the charging interface of the to-be-charged device is connected to the power supply interface 310, the first pin 311 pulls down an electrical level of an end, connected to the power supply source 320, in the trigger circuit, a trigger is turned on, and further the trigger signal is output; the control circuit includes a transistor 341, a shutdown-without-poweroff power source 342, and a controller 343; and the trigger signal is output to a gate of the transistor 341, causing that a drain connected to the shutdown-without-poweroff power source 342 and a grounded source are conducted to each other, an electrical level of a turn-on signal input end, connected also to the shutdown-without-poweroff power source 342, of a controller is pulled down, the trigger turns on a charging control unit, and a control signal is output to control a controlled component 350 to make the power supply source 320 to supply power outwards; and in addition, the controller controls, according to the trigger signal, the mobile power supply terminal to enter a power supply mode, where in the power supply mode, the control circuit is configured only to control the power supply source to supply power to the to-be-charged device.

Compared with a conventional device, the mobile power supply terminal in this embodiment is added with a trigger circuit and a control circuit that controls the mobile power supply terminal to switch modes and controls whether to supply power. Therefore, in a shutdown mode, a corresponding charging functional module can be quickly turned on using a connection to a to-be-charged device, implementing quick outward power supply, and in addition, another functional module unrelated to a charging function is not turned on, thereby reducing power consumption, and prolonging a standby time and a service life of a power supply source.

Embodiment 6

Figure 4:
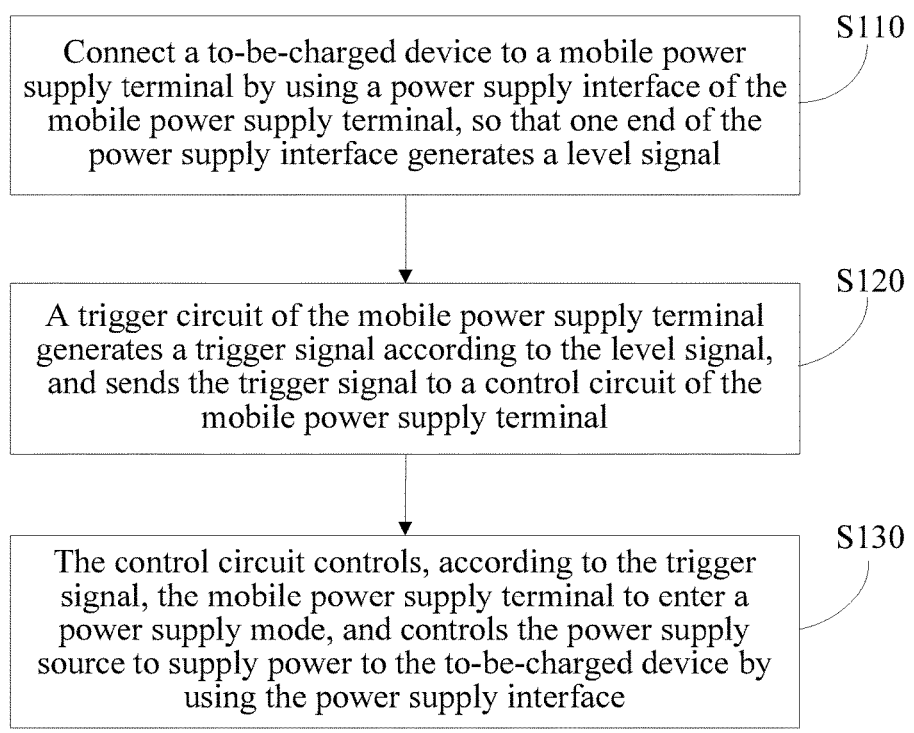
FIG. 4 is a schematic flowchart of power supply from a mobile power supply terminal according to an embodiment of the present disclosure.

This embodiment provides a power supply method of a mobile power supply terminal. As shown in FIG. 4, the power supply method of the mobile power supply terminal includes:

Step S110: Connect a to-be-charged device to a mobile power supply terminal using a power supply interface of the mobile power supply terminal, so that one end of the power supply interface generates a level signal.

Step S120: A trigger circuit of the mobile power supply terminal generates a trigger signal according to the level signal, and sends the trigger signal to a control circuit of the mobile power supply terminal.

Step S130: The control circuit controls, according to the trigger signal, the mobile power supply terminal to enter a power supply mode, and controls the power supply source to supply power to the to-be-charged device using the power supply interface, where the control circuit in the power supply mode is configured only to control the power supply source to supply power to the to-be-charged device.

By means of the power supply method of the mobile power supply terminal in this embodiment, the mobile power supply terminal that supplies power is switched to a third mode other than a shutdown mode and a startup mode, namely, a charging mode to perform charging. Compared with charging in the startup mode, energy consumption is low, a current of a power supply source is small, and therefore heat consumption is small, thereby helping to prolong a service life of the power supply source. In addition, when the mobile power supply terminal is in the shutdown mode, the mobile power supply terminal can quickly switch to the power supply mode put forward in this embodiment, and a charging readiness time is short. A user does not need to manually trigger the mobile power supply terminal to enter the startup mode to implement the charging, thereby reducing operation complexity.

As a further description of this embodiment, the controlling, by the control circuit according to the trigger signal, the mobile power supply terminal to enter a power supply mode, and controlling the power supply source to supply power to the to-be-charged device using the power supply interface includes:

Step S131: Input the trigger signal to a control end of a controlled switch of the control circuit, so that an input end and an output end of the controlled switch are conducted to each other, where the input end of the controlled switch is connected to a shutdown-without-poweroff power source, and the output end is grounded.

Step S132: Pull down an electrical level of a turn-on signal input end of a controller of the control circuit connected to the shutdown-without-poweroff power source.

Step S133: After the electrical level of the turn-on signal input end is pulled down, the controller controls the mobile power supply terminal to enter the power supply mode, and controls the power supply source to supply power to the to-be-charged device using the power supply interface.

In this embodiment, the trigger signal is first converted, through an action of the controlled switch and the shutdown-without-poweroff power source, into a triggering low electrical level that can be identified by the controller, and then the controller controls a subsequent mode of the mobile power supply terminal and whether to supply power. The controlling is simple and quick, and the structure is exquisite.

In a specific implementation process, there are multiple methods for step S133 of controlling the power supply source to supply power outwards using the power supply interface, which may be implemented by controlling, by the controller, a controlled component such as a controlled transistor or triode, which is connected between the power supply source and the power supply interface, and controlling whether a path is formed between the power supply source and the power supply interface. The following provides a more preferred manner:

The controlling the power supply source to supply power to the to-be-charged device using the power supply interface includes, after the electrical level of the turn-on signal input end is pulled down, generating, by the controller, a power supply control signal; receiving, by an enabling end of a transformer connected between the power supply source and the power supply interface, the control signal, and turning on the transformer according to the control signal, to form a path between the power supply source and the power supply interface; and supplying, by the power supply source, power to the to-be-charged device using the transformer and the power supply interface.

In this embodiment, the transformer connected between the power supply interface and the power supply source is controlled using the power supply control signal output by the controller, to continue to implement conduction of a power supply loop between the power supply interface and the power supply source, to control whether to supply power outwards, where the transformer further has a function of changing a voltage value of an output voltage of the power supply source; therefore, this method implements two functions using one structure. Therefore, using this method, a hardware structure can be simplified, facilitating microminiaturization and integration of the hardware structure, and also reducing costs of an electronic component.

Generally, the mobile power supply terminal has two state modes. The first mode is the startup mode, and the second mode is the shutdown mode. In the power supply method of the mobile power supply terminal in this embodiment, a third mode, namely, the charging mode that is different from the foregoing two modes is provided. The following provides a method of switching from the startup mode to the charging mode:

The power supply method of the mobile power supply terminal further includes, when receiving the trigger signal, turning on, by the control circuit, a charging control unit, and turning off a communications control unit according to a selection of the user.

In the charging mode, the charging control unit is turned on to control work of a power supply unit; and the communications control unit is turned off, so that all functional units related to communication are turned off, to reduce power consumption, and reduce a current and heat consumption in the power supply source. In a specific implementation process, after the control circuit receives the trigger signal, the mobile power supply terminal may be forcibly switched from the startup mode to the charging mode. In this embodiment, the communications control unit is turned off according to the selection of the user, thereby implementing more humanized and more proper man-machine interaction, and allowing the user to control a state mode of the mobile power supply terminal according to a need.

In addition, on the basis of any of the foregoing solutions of the power supply method, the power supply method of the mobile power supply terminal in this embodiment further prescribes switching from the power supply mode to the shutdown mode and the startup mode in the power supply method of the mobile power supply terminal, which is as follows: the power supply method of the mobile power supply terminal further includes disconnecting the to-be-charged device from the mobile power supply terminal; and controlling, by the control circuit according to a control instruction selected by the user or a specified instruction, the mobile power supply terminal to enter the shutdown mode.

The control instruction selected by the user may be switching the mobile power supply terminal from the charging mode to the startup mode or the shutdown mode, which may be selected by the user according to a need. The specified instruction may be an instruction preset inside the mobile power supply terminal. After completing power supply, the mobile power supply terminal directly enters the startup mode or the shutdown mode, or enters the charging mode again. In a specific implementation process, the control instruction selected by the user may be used in combination with the specified instruction, when the user does not perform a corresponding operation within predetermined duration, the specified instruction takes effect, to control the mobile power supply terminal to enter the startup mode. Entering the shutdown mode can reduce unnecessary energy consumption to the utmost extent.

In summary, multiple technical solutions are provided in the power supply method of the mobile power supply terminal in this embodiment, so that in a shutdown mode, the mobile power supply terminal can quickly enter a charging mode of power supply. Energy consumption is small in the charging mode compared with the startup mode. Therefore, heat consumption of a power supply source is small, thereby helping to prolong a standby time and a service life of the power supply source.

A person of ordinary skill in the art may understand that, each aspect of the present disclosure or a possible implementation manner of each aspect may be implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a ROM, an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A mobile power supply terminal, comprising:
a power supply source;
a control circuit;
a power supply interface; and
a trigger circuit, wherein the power supply source is separately connected to the power supply interface and the control circuit;
wherein one end of the power supply interface is separately connected to the trigger circuit and the control circuit, and the other end is connected to a charging interface of a to-be-charged device,
wherein the to-be-charged device is connected to the mobile power supply terminal using the power supply interface, so that one end of the power supply interface generates a level signal,
wherein the trigger circuit generates a trigger signal according to the level signal, and sends the trigger signal to the control circuit; and
the control circuit controls, according to the trigger signal, the mobile power supply terminal to enter a power supply mode, and controls the power supply source to supply power to the to-be-charged device using the power supply interface, wherein the control circuit in the power supply mode is configured only to control the power supply source to supply power to the to-be-charged device.

2. The mobile power supply terminal according to claim 1, wherein the control circuit is further configured to:
receive the trigger signal; and
control, according to a user selection or a specified command, the mobile power supply terminal to turn off at least one of a communications module and a display.

3. The mobile power supply terminal according to claim 1, wherein the control circuit is further configured to control, according to a control instruction selected by the user or a specified instruction, the mobile power supply terminal to enter a shutdown mode after the charging interface is disconnected from the to-be-charged device.

4. The mobile power supply terminal according to claim 1, wherein the control circuit comprises:
a controller;
a shutdown-without-poweroff power source; and
a controlled switch,
wherein a turn-on signal input end of the controller is connected to the shutdown-without-poweroff power source,
wherein an input end of the controlled switch is connected to the shutdown-without-poweroff power source,
wherein a control end is connected to an output end of the trigger circuit,
wherein an output end is grounded,
wherein, after the control end of the controlled switch receives the trigger signal, the input end and the output end of the controlled switch are conducted to each other, so that an electrical level of the turn-on signal input end of the controller is pulled down, and
wherein, after the electrical level of the turn-on signal input end is pulled down, the controller is configured to control the mobile power supply terminal to enter the power supply mode, and control the power supply source to supply power to the to-be-charged device using the power supply interface.

5. The mobile power supply terminal according to claim 4, further comprising a transformer disposed between the power supply source and the power supply interface, wherein an enabling end of the transformer is connected to the controller, and is configured to receive a power supply control signal and turn on the transformer according to the power supply control signal in order to form a path between the power supply source and the power supply interface, wherein the power supply control signal is generated by the controller according to the trigger signal and output to the transformer.

6. A power supply method of a mobile power supply terminal, comprising:
connecting a to-be-charged device to the mobile power supply terminal using a power supply interface of the mobile power supply terminal, so that one end of the power supply interface generates a level signal;
generating, by a trigger circuit of the mobile power supply terminal, a trigger signal according to the level signal;
sending the trigger signal to a control circuit of the mobile power supply terminal; and
controlling, by the control circuit according to the trigger signal, the mobile power supply terminal to enter a power supply mode, and thereby controlling the power supply source to supply power to the to-be-charged device using the power supply interface, wherein the control circuit in the power supply mode is configured only to control the power supply source to supply power to the to-be-charged device.

7. The power supply method according to claim 6, wherein controlling, by the control circuit according to the trigger signal, the mobile power supply terminal to enter the power supply mode, and thereby controlling the power supply source to supply power to the to-be-charged device using the power supply interface comprises:
inputting the trigger signal to a control end of a controlled switch of the control circuit, so that an input end and an output end of the controlled switch are conducted to each other, wherein the input end of the controlled switch is connected to a shutdown-without-poweroff power source, and the output end is grounded;
pulling down an electrical level of a turn-on signal input end of a controller of the control circuit connected to the shutdown-without-poweroff power source;
controlling, by the controller, the mobile power supply terminal to enter the power supply mode after the electrical level of the turn-on signal input end is pulled down; and
controlling the power supply source to supply power to the to-be-charged device using the power supply interface.

8. The power supply method according to claim 7, wherein controlling the power supply source to supply power to the to-be-charged device using the power supply interface comprises:
generating, by the controller, a power supply control signal after the electrical level of the turn-on signal input end is pulled down;
receiving, by an enabling end of a transformer connected between the power supply source and the power supply interface, the control signal;
turning on the transformer according to the control signal in order to form a path between the power supply source and the power supply interface; and
supplying, by the power supply source, power to the to-be-charged device using the transformer and the power supply interface.

9. The power supply method according to claim 6, further comprising:
receiving, by the control circuit, the trigger signal; and
controlling, according to a user selection or a specified command, the mobile power supply terminal to turn off at least one of a communications module and a display.

10. The power supply method according to claim 6, further comprising:
disconnecting the to-be-charged device from the mobile power supply terminal; and
controlling, by the control circuit according to a control instruction selected by the user or a specified instruction, the mobile power supply terminal to enter a shutdown mode.

* * * * *